(12) United States Patent
Kang et al.

(10) Patent No.: US 11,705,842 B2
(45) Date of Patent: Jul. 18, 2023

(54) DECOUPLING CONTROL SYSTEM AND METHOD FOR HARMONIC CURRENT OF SALIENT POLE SYNCHRONOUS MOTOR

(71) Applicants: TONGJI UNIVERSITY, Shanghai (CN); CRRC QINGDAO SIFANG CO., LTD., Shandong (CN)

(72) Inventors: Jinsong Kang, Shanghai (CN); Siyuan Mu, Shanghai (CN); Zhixun Ma, Shanghai (CN); Houxiao Jiang, Shanghai (CN); Donghua Wu, Shandong (CN); Fujie Jiang, Shandong (CN); Xinmai Gao, Shandong (CN)

(73) Assignee: TONJI UNIVERSITY, Shanghai (CN)

( * ) Notice: Subject to any disclaimer, the term of this patent is extended or adjusted under 35 U.S.C. 154(b) by 0 days.

(21) Appl. No.: 17/183,186

(22) Filed: Feb. 23, 2021

(65) Prior Publication Data

US 2021/0408952 A1 Dec. 30, 2021

(30) Foreign Application Priority Data

Jun. 27, 2020 (CN) .......................... 202010593436.1

(51) Int. Cl.
*H02P 21/22* (2016.01)
*H02P 21/13* (2006.01)

(52) U.S. Cl.
CPC .............. *H02P 21/22* (2016.02); *H02P 21/13* (2013.01)

(58) Field of Classification Search
CPC .............. G01R 33/561; G01R 19/0092; G01R 31/343; H02P 21/13
See application file for complete search history.

(56) References Cited

U.S. PATENT DOCUMENTS 6,888,330 B2 * 5/2005 Arimitsu ................ H02K 16/02
                                                                318/495
2002/0097015 A1 * 7/2002 Kitajima ................. H02P 6/10
                                                                318/432

OTHER PUBLICATIONS

S. Mu, J. Kang, Z. Zhong and Z. Ma, "Improved detecting method for multiple rotating reference frames based harmonic control of PMSMs," 2020 Chinese Automation Congress (CAC), 2020, pp. 5458-5463, (Year: 2020).*

Liao et al., "Torque Ripple Suppression of Permanent Magnet Synchronous Motor by the Harmonic Injection", Proceedings of the CSEE, vol. 31 No. 21, Jul. 25, 2011, pp. 119-127, with English Abstract.

(Continued)

*Primary Examiner* — Said Bouziane
(74) *Attorney, Agent, or Firm* — Hamre, Schumann, Mueller & Larson, P.C.

(57) ABSTRACT

A decoupling control system for a salient pole synchronous motor that includes a harmonic current detection module, configured to acquire 6k±1 harmonic current feedback; a linear transformation module, configured to perform linear transformation on 6k±1 harmonic current references and 6k±1 harmonic current feedback in a harmonic reference frame separately to acquire new harmonic currents; and a harmonic current decoupling control module, configured to make adjustment according to an error between a harmonic current reference subjected to the linear transformation and harmonic current feedback subjected to the linear transformation, and perform independent decoupling control over each of the harmonic currents.

10 Claims, 4 Drawing Sheets

(56) References Cited

OTHER PUBLICATIONS

Zhong et al., "A Harmonic Voltage and Current Coupling Permanent Magnet Synchronous Motor Model and Feedforward Control", Transaction of China Electrotechnical Society, vol. 32 No. 18, Sep. 2017, with English Abstract, 12 pages provided.

* cited by examiner

DECOUPLING CONTROL SYSTEM AND METHOD FOR HARMONIC CURRENT OF SALIENT POLE SYNCHRONOUS MOTOR

FIELD OF TECHNOLOGY

The present invention relates to the technical field of control over a synchronous motor, in particular to a decoupling control system and method for a harmonic current of a salient pole synchronous motor.

BACKGROUND

An interior permanent magnet synchronous motor generally serves as a driving motor on account of high efficiency, high power density, wide speed adjustment range, etc. and is widely applied in the field of electric automobiles and other fields. However, due to influence of a slot effect of the motor, back electromotive force distortion caused by harmonic flux linkage of permanent magnet dead-time effect of an inverter, etc., harmonic current which is 6k±1 times the fundamental frequency exists in stator windings of the motor. If not controlled, the harmonic current may cause additional copper loss and core loss, and produce torque pulsation at the same time, thereby influencing efficiency, noise, and torque output stability of the motor.

The permanent magnet synchronous motor generally controls a stator current through a PI controller, but the PI controller cannot effectively control the harmonic current due to bandwidth limitation. However, in frames rotating at the same speed, an alternating current component with any frequency may be converted into a direct current. Based on such a principle, a multiple reference frame is widely used for detection and control of the harmonic current of the permanent magnet synchronous motor, for example, LIAO Yong, et al. Torque Ripple Suppression of Permanent Magnet Synchronous Motor by the Harmonic Injection, Proceedings of the Chinese Society of Electrical Engineering. 2011, vol. 31 (no. 21), pp. 119-127.

According to a traditional method for controlling a harmonic current based on multiple synchronous coordinate transformation, after harmonic current being converted to a direct current component in the frame of harmonic current, PI control is directly performed over the direct current component. However, as indicated in the paper (ZHONG Zaimin, JIANG Shang, KANG Jinsong, CHEN Xueping and ZHOU Yingkun, A Harmonic Voltage and Current Coupling Permanent Magnet Synchronous Motor Model and Feedforward Control, Transactions of China Electrotechnical Society, vol. 32, no. 18, pp. 131-142, 2017.), coupling exists between positive-sequence and negative-sequence harmonic currents of the same frequency for a salient pole permanent magnet synchronous motor, which influences control performance of the harmonic current. According to the traditional harmonic current control methods, no controller is designed on the basis of a dynamic equation of the harmonic current, dynamic coupling between harmonic of the salient pole synchronous motor is omitted, and complete decoupling among the harmonic currents cannot be achieved, thereby influencing control accuracy and response speed of the harmonic current.

SUMMARY

An objective of the present invention is to overcome the above defects existing in the prior art, and provide a decoupling control system and method for the harmonic current of a salient pole synchronous motor capable of improving control accuracy and response speed of the harmonic current.

The objective of the present invention may be achieved through the following technical solution:

a decoupling control system for a harmonic current of a salient pole synchronous motor includes:

a harmonic current detection module, configured to detect and acquire 6k±1 harmonic currents and take the same as harmonic current feedback, wherein k is a positive integer;

a linear transformation module, configured to perform linear transformation on 6k±1 harmonic current references and detected 6k±1 harmonic current feedback in a harmonic reference frame separately to acquire new harmonic currents;

a harmonic current decoupling control module, configured to adjust the output voltage according to the error between harmonic current reference subjected to the linear transformation and harmonic current feedback subjected to the linear transformation, and perform independent decoupling control over each of the harmonic currents;

an inversely linear transformation module, configured to perform the inverse linear transformation on the output voltage of the harmonic current decoupling control module to acquire the control output voltage in the harmonic reference frame; and a motor control module, configured to take the control output voltage as a part of output voltage reference of the inverter for controlling operation of the salient pole synchronous motor.

Preferably, a particular manner in which the linear transformation module performs the linear transformation is $$\begin{bmatrix} i_{d6k1-ref} \\ i_{q6k1-ref} \\ i_{q6k2-ref} \\ i_{d6k2-ref} \end{bmatrix} = T \Box \begin{bmatrix} i_{d(6k-1)\_ref}^{6k-1} \\ i_{q(6k-1)\_ref}^{6k-1} \\ i_{d(6k+1)\_ref}^{6k+1} \\ i_{q(6k+1)\_ref}^{6k+1} \end{bmatrix} \begin{bmatrix} i_{d6k1} \\ i_{q6k1} \\ i_{q6k2} \\ i_{d6k2} \end{bmatrix} = T \Box \begin{bmatrix} i_{d(6k-1)}^{6k-1} \\ i_{q(6k-1)}^{6k-1} \\ i_{d(6k+1)}^{6k+1} \\ i_{q(6k+1)}^{6k+1} \end{bmatrix}.$$

$$T = \begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

wherein $i_{d(6k-1)\_ref}^{6k-1}$ and $i_{q(6k-1)\_ref}^{6k-1}$ are 6k-1 harmonic current references in the harmonic reference frame, $i_{d(6k+1)\_ref}^{6k+1}$ and $i_{q(6k-1)\_ref}^{6k+1}$ are 6k+1 harmonic current references in the harmonic reference frame, $i_{d6k1-ref}$, $i_{q6k1-ref}$, $i_{q6k2-ref}$ and $i_{d6k2-ref}$ are harmonic current references subjected to the linear transformation, $i_{d(6k-1)}^{6k-1}$ and $i_{q(6k-1)}^{6k-1}$ are 6k-1 harmonic current feedback in the harmonic reference frame, $i_{d(6k+1)}^{6k+1}$ and $i_{q(6k+1)}^{6k+1}$ are 6k+1 harmonic current feedback in the harmonic reference frame, $i_{d6k1}$, $i_{q6k1}$, $i_{q6k2}$ and $i_{d6k2}$ are harmonic current feedback subjected to the linear transformation, subscripts d and q being an axis d and an axis q in the harmonic reference frame respectively, and subscript T is a transformational matrix.

Preferably, the harmonic current decoupling control module includes a plurality of decoupling branches for separately performing independent decoupling control over each of the harmonic currents subjected to the linear transformation, wherein the decoupling branch includes a harmonic controller and a decoupling voltage compensation unit which are sequentially connected, the harmonic controller being configured to adjust a first output voltage according to the error between the harmonic current reference and harmonic current feedback, and the decoupling voltage compensation unit being configured to compensate for the first voltage output by the harmonic controller to acquire the output voltage.

Preferably, the harmonic controller is designed with an open-loop transfer function of the harmonic current to meet the following equation:

$$\begin{bmatrix} i_{d6k1} \\ i_{q6k1} \\ i_{q6k2} \\ i_{d6k2} \end{bmatrix} = \begin{bmatrix} \frac{1}{R_s + L_d s} \\ & \frac{1}{R_s + L_q s} \\ & & \frac{1}{R_s + L_q s} \\ & & & \frac{1}{R_s + L_d s} \end{bmatrix} \begin{bmatrix} u_{c-d6k1} \\ u_{c-q6k1} \\ u_{c-q6k2} \\ u_{c-d6k2} \end{bmatrix},$$

wherein $i_{d6k1}$, $i_{q6k1}$, $i_{q6k2}$ and $i_{d6k2}$ are harmonic current feedback subjected to the linear transformation, $u_{c-d6k1}$, $u_{c-q6k1}$, $u_{c-q6k2}$ and $u_{c-d6k2}$ are first voltages, $R_s$ is the stator resistance, $L_q$ is the q-axis inductance, $L_d$ is the d-axis inductance and s is a Laplace operator;

a compensation voltage of the decoupling voltage compensation unit is $$\begin{bmatrix} u_{com-d6k1} \\ u_{com-q6k1} \\ u_{com-q6k2} \\ u_{com-d6k2} \end{bmatrix} = \begin{bmatrix} 0 & -\omega_r L_q & 0 & 6k\omega_r L_d \\ \omega_r L_d & 0 & -6k\omega_r L_q & 0 \\ 0 & 6k\omega_r L_q & 0 & -\omega_r L_d \\ -6k\omega_r L_d & 0 & \omega_r L_q & 0 \end{bmatrix} \begin{bmatrix} i_{d6k1} \\ i_{q6k1} \\ i_{q6k2} \\ i_{d6k2} \end{bmatrix},$$

so as to acquire the compensated output voltage:

$$\begin{bmatrix} u_{d6k1} \\ u_{q6k1} \\ u_{q6k2} \\ u_{d6k2} \end{bmatrix} = \begin{bmatrix} u_{c-d6k1} \\ u_{c-q6k1} \\ u_{c-q6k2} \\ u_{c-d6k2} \end{bmatrix} + \begin{bmatrix} u_{com-d6k1} \\ u_{com-q6k1} \\ u_{com-q6k2} \\ u_{com-d6k2} \end{bmatrix},$$

wherein $u_{com-d6k1}$, $u_{com-q6k1}$, $u_{com-q6k2}$ and $u_{com-d6k2}$ are compensation voltages, $\omega_r$ is an electric angular velocity of the motor, and $u_{d6k1}$, $u_{q6k1}$, $u_{q6k2}$ and $u_{d6k2}$ are output voltages.

Preferably, a particular manner in which the inversely linear transformation module performs the inversely linear transformation is $$\begin{bmatrix} u_{d(6k-1)}^{6k-1} \\ u_{q(6k-1)}^{6k-1} \\ u_{d(6k+1)}^{6k+1} \\ u_{q(6k+1)}^{6k+1} \end{bmatrix} = T^{-1} \begin{bmatrix} u_{d6k1} \\ u_{q6k1} \\ u_{q6k2} \\ u_{d6k2} \end{bmatrix} = \frac{1}{2} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \begin{bmatrix} u_{d6k1} \\ u_{q6k1} \\ u_{q6k2} \\ u_{d6k2} \end{bmatrix},$$

wherein $u_{d(6k-1)}^{6k-1}$ and $u_{q(6k-1)}^{6k-1}$ are 6k−1 control output voltages in the harmonic reference frame, $u_{d(6k+1)}^{6k+1}$ and $u_{q(6k+1)}^{6k+1}$ are 6k+1 control output voltages in the harmonic reference frame, $u_{d6k1}$, $u_{q6k1}$, $u_{q6k2}$ and $u_{d6k2}$ are output voltages, subscripts d and q being an axis d and an axis q in the harmonic reference frame respectively, and subscript T is a transformational matrix.

A decoupling control method for a harmonic current of a salient pole synchronous motor includes the following steps:

S1. detecting 6k±1 harmonic currents in a harmonic reference frame which are treated as harmonic current feedback, wherein k is a positive integer;

S2. separately performing linear transformation on 6k±1 harmonic current references and the detected 6k±1 harmonic current feedback in a harmonic reference frame to acquire new harmonic currents;

S3. adjusting an output voltage according to an error between a harmonic current reference subjected to the linear transformation and harmonic current feedback subjected to the linear transformation, and performing independent decoupling control over each of the harmonic currents;

S4. performing inversely linear transformation on the output voltage to acquire a control output voltage in the harmonic reference frame; and S5. taking the control output voltage as a part of output voltage reference of the inverter for controlling operation of the salient pole synchronous motor.

Preferably, a particular manner of acquiring the new harmonic currents through the linear transformation in step S2 is $$\begin{bmatrix} i_{d6k1-ref} \\ i_{q6k1-ref} \\ i_{q6k2-ref} \\ i_{d6k2-ref} \end{bmatrix} = T \begin{bmatrix} i_{d(6k-1)\_ref}^{6k-1} \\ i_{q(6k-1)\_ref}^{6k-1} \\ i_{d(6k+1)\_ref}^{6k+1} \\ i_{q(6k+1)\_ref}^{6k+1} \end{bmatrix} \begin{bmatrix} i_{d6k1} \\ i_{q6k1} \\ i_{q6k2} \\ i_{d6k2} \end{bmatrix} = T \begin{bmatrix} u_{d(6k-1)}^{6k-1} \\ u_{q(6k-1)}^{6k-1} \\ u_{d(6k+1)}^{6k+1} \\ u_{q(6k+1)}^{6k+1} \end{bmatrix},$$

$$T = \begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

wherein $i_{d(6k-1)\_ref}^{6k-1}$ and $i_{q(6k-1)\_ref}^{6k-1}$ are 6k−1 harmonic current references in the harmonic reference frame, $i_{d(6k+1)\_ref}^{6k+1}$ and $i_{d(6k+1)\_ref}^{6k+1}$ are harmonic current references 6k+1 in the harmonic reference frame, $i_{d6k1-ref}$, $i_{q6k1-ref}$, $i_{q6k2-ref}$ and $i_{d6k2-ref}$ are harmonic current references subjected to the linear transformation, $i_{d(6k-1)}^{6k-1}$, and $i_{q(6k-1)}^{6k-1}$ are 6k−1 harmonic current feedback in the harmonic reference frame, $i_{d(6k+1)}^{6k+1}$ and $i_{q(6k+1)}^{6k+1}$ are 6k+1 harmonic current feedback in the harmonic reference frame, $i_{d6k1}$, $i_{q6k1}$, $i_{q6k2}$ and $i_{d6k2}$ are harmonic current feedback subjected to the linear transformation, wherein subscripts d and q being an axis d and an axis q in the harmonic reference frame respectively, and subscript T is a transformational matrix.

Preferably, step 3 particularly includes: separately inputting each of the harmonic currents subjected to the linear transformation into an independent decoupling branch, wherein the decoupling branch includes a harmonic controller and a decoupling voltage compensation unit which are sequentially connected, firstly, the harmonic controller adjusting a first output voltage according to the error between the harmonic current reference and the harmonic current feedback, and then the decoupling voltage compensation unit compensating for the first voltage output by the harmonic controller to acquire the output voltage.

Preferably, the harmonic controller in step S3 is designed with an open-loop transfer function of the harmonic current to meet the following equation:

$$\begin{bmatrix} i_{d6k1} \\ i_{q6k1} \\ i_{q6k2} \\ i_{d6k2} \end{bmatrix} = \begin{bmatrix} \frac{1}{R_s + L_d s} & & & \\ & \frac{1}{R_s + L_q s} & & \\ & & \frac{1}{R_s + L_q s} & \\ & & & \frac{1}{R_s + L_d s} \end{bmatrix} \begin{bmatrix} u_{c-d6k1} \\ u_{c-q6k1} \\ u_{c-q6k2} \\ u_{c-d6k2} \end{bmatrix},$$

wherein $i_{d6k1}$, $i_{q6k1}$, $i_{q6k2}$ and $i_{d6k2}$ are harmonic current feedback subjected to the linear transformation, $u_{c-d6k1}$, $u_{c-q6k1}$, $u_{c-q6k2}$ and $u_{c-d6k2}$ are first voltages, $R_s$ is a stator resistance, $L_q$ is a q-axis inductance, $L_d$ is a d-axis inductance and s is a Laplace operator;

a compensation voltage of the decoupling voltage compensation unit is $$\begin{bmatrix} u_{com-d6k1} \\ u_{com-q6k1} \\ u_{com-q6k2} \\ u_{com-d6k2} \end{bmatrix} = \begin{bmatrix} 0 & -\omega_r L_q & 0 & 6k\omega_r L_d \\ \omega_r L_d & 0 & -6k\omega_r L_q & 0 \\ 0 & 6k\omega_r L_d & 0 & -\omega_r L_d \\ -6k\omega_r L_d & 0 & \omega_r L_q & 0 \end{bmatrix} \begin{bmatrix} i_{d6k1} \\ i_{q6k1} \\ i_{q6k2} \\ i_{d6k2} \end{bmatrix},$$

so as to acquire the compensated output voltage:

$$\begin{bmatrix} u_{d6k1} \\ u_{q6k1} \\ u_{q6k2} \\ u_{d6k2} \end{bmatrix} = \begin{bmatrix} u_{c-d6k1} \\ u_{c-q6k1} \\ u_{c-q6k2} \\ u_{c-d6k2} \end{bmatrix} + \begin{bmatrix} u_{com-d6k1} \\ u_{com-q6k1} \\ u_{com-q6k2} \\ u_{com-d6k2} \end{bmatrix},$$

wherein $u_{com-d6k1}$, $u_{com-q6k1}$, $u_{com-q6k2}$ and $u_{com-d6k2}$ are compensation voltages, $\omega_r$ is an electric angular velocity of the motor, and $u_{d6k1}$, $u_{q6k1}$, $u_{q6k2}$ and $u_{d6k2}$ are output voltages.

Preferably, a particular manner of acquiring the control output voltage in the harmonic reference frame through the inversely linear transformation in step S4 is $$\begin{bmatrix} u_{d(6k-1)}^{6k-1} \\ u_{q(6k-1)}^{6k-1} \\ u_{d(6k+1)}^{6k+1} \\ u_{q(6k+1)}^{6k+1} \end{bmatrix} = T^{-1} \square \begin{bmatrix} u_{d6k1} \\ u_{q6k1} \\ u_{q6k2} \\ u_{d6k2} \end{bmatrix} = \frac{1}{2} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \square \begin{bmatrix} u_{d6k1} \\ u_{q6k1} \\ u_{q6k2} \\ u_{d6k2} \end{bmatrix},$$

wherein $u_{d(6k-1)}^{6k-1}$ and $u_{q(6k-1)}^{6k-1}$ are 6k−1 control output voltages in the harmonic reference frame, $u_{d(6k+1)}^{6k+1}$ and $u_{q(6k+1)}^{6k+1}$ are 6k+1 control output voltages in the harmonic reference frame, $u_{d6k1}$, $u_{q6k1}$, $u_{q6k2}$ and $u_{d6k2}$ are output voltages, subscripts d and q being the axis d and the axis q in the harmonic reference frame respectively, and subscript T is a transformational matrix.

Compared with the prior art, the present invention has the following advantages:

(1) the harmonic current decoupling control module of the present invention is designed with the harmonic controller and the decoupling voltage compensation unit, thereby achieving dynamic decoupling control over the harmonic current, and improving control accuracy and response speed of the harmonic current; and (2) the present invention utilizes linear transformation rather than directly performs decoupling control over the harmonic current in the harmonic reference frame, thereby it's easier for implementation.

In the figures: 1 harmonic current detection module, 2 linear transformation module, 3 harmonic current decoupling control module, 4 inversely linear transformation module, 5 coordinate transformation module, 6 motor control module, 31 harmonic controller, and 32 decoupling voltage compensation unit.

DESCRIPTION OF THE EMBODIMENTS

Hereinafter, the present invention will be described in details with reference to accompanying drawings and particular embodiments. It should be noted that description of the following embodiments is merely exemplary substantially, the present invention does not intend to limit an applicable object or a purpose thereof, and the present invention is not limited to the following embodiments.

Embodiments

Figure 1:
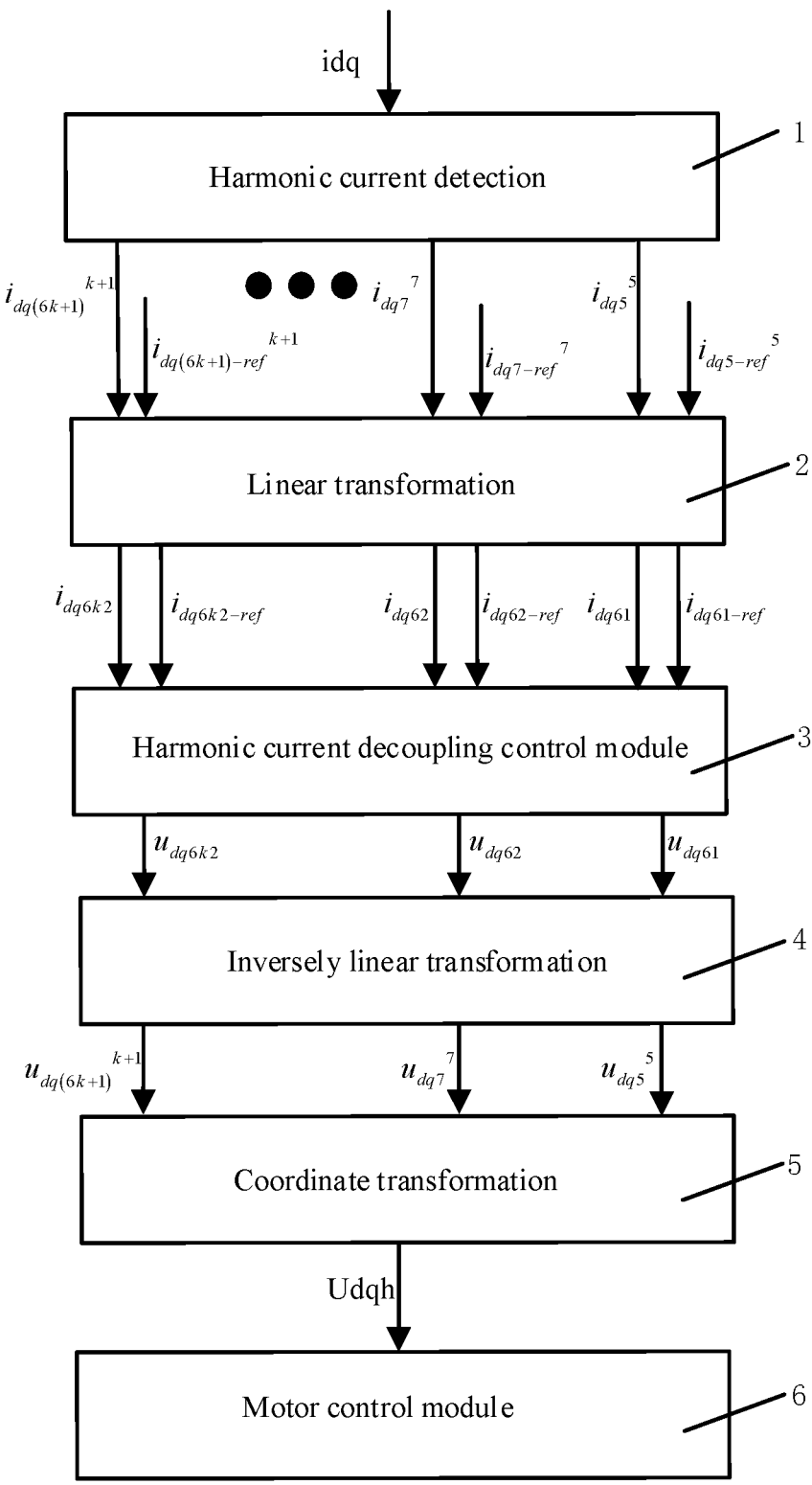
FIG. 1 is a structural block diagram of a decoupling control system for a harmonic current of a salient pole synchronous motor of the present invention.

As shown in FIG. 1, a decoupling control system for a harmonic current of a salient pole synchronous electric includes:

a harmonic current detection module 1, configured to detect and acquire 6k±1 harmonic currents and take the same as harmonic current feedback, wherein k is a positive integer;

a linear transformation module 2, configured to perform linear transformation on 6k±1 harmonic current references and detected 6k±1 harmonic current feedback to acquire new harmonic currents in a harmonic reference frame separately;

a harmonic current decoupling control module 3, configured to adjust an output voltage according to an error between a harmonic current reference subjected to the linear transformation and harmonic current feedback subjected to the linear transformation, and perform independent decoupling control over each of the harmonic currents;

an inversely linear transformation module 4, configured to perform inversely linear transformation on the output voltage of the harmonic current decoupling control module 3 to acquire a control output voltage in the harmonic reference frame; and a motor control module 6, configured to take the control output voltage as a part of output voltage reference of the inverter for controlling operation of the salient pole synchronous motor.

A coordinate transformation module 5 is further included before the motor control module 6, and the control output voltage may be transformed, by the coordinate transformation module 5, to a d,q rotating frame or a two-phase rest frame through rotating coordinate transformation, so as to be input into the motor control module 6 for control over the salient pole synchronous motor.

A particular manner in which the linear transformation module 2 performs the linear transformation is $$\begin{bmatrix} i_{d6k1\_ref} \\ i_{q6k1\_ref} \\ i_{q6k2\_ref} \\ i_{d6k2\_ref} \end{bmatrix} = T \square \begin{bmatrix} i^{6k-1}_{d(6k-1)\_ref} \\ i^{6k-1}_{q(6k-1)\_ref} \\ i^{6k+1}_{d(6k+1)\_ref} \\ i^{6k+1}_{q(6k+1)\_ref} \end{bmatrix} \begin{bmatrix} i_{d6k1} \\ i_{q6k1} \\ i_{q6k2} \\ i_{d6k2} \end{bmatrix} = T \square \begin{bmatrix} u^{6k-1}_{d(6k-1)} \\ u^{6k-1}_{q(6k-1)} \\ u^{6k+1}_{d(6k+1)} \\ u^{6k+1}_{q(6k+1)} \end{bmatrix}, \quad (1)$$

$$T = \begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

wherein $i_{d(6k-1)\_ref}^{6k-1}$ and $i_{q(6k-1)\_ref}^{6k-1}$ are 6k−1 harmonic current references in the harmonic reference frame, $i_{d(6k+1)\_ref}^{6k+1}$ and $i_{q(6k+1)\_ref}^{6k+1}$ are 6k+1 harmonic current references in the harmonic reference frame, $i_{d6k1\_ref}$, $i_{q6k1\_ref}$, $i_{q6k2\_ref}$ and $i_{d6k2\_ref}$ are harmonic current references subjected to the linear transformation, $i_{d(6k-1)}^{6k-1}$ and $i_{q(6k-1)}^{6k-1}$ are harmonic current feedback 6k−1 in the harmonic reference frame, $i_{d(6k+1)}^{6k+1}$ and $i_{q(6k+1)}^{6k+1}$ are 6k+1 harmonic current feedback in the harmonic reference frame, $i_{d6k1}$, $i_{q6k1}$, $i_{q6k2}$ and $i_{d6k2}$ are harmonic current feedback subjected to the linear transformation, subscripts d and q being the axis d and the axis q in the harmonic reference frame respectively, and subscript T is a transformational matrix.

Figure 3:
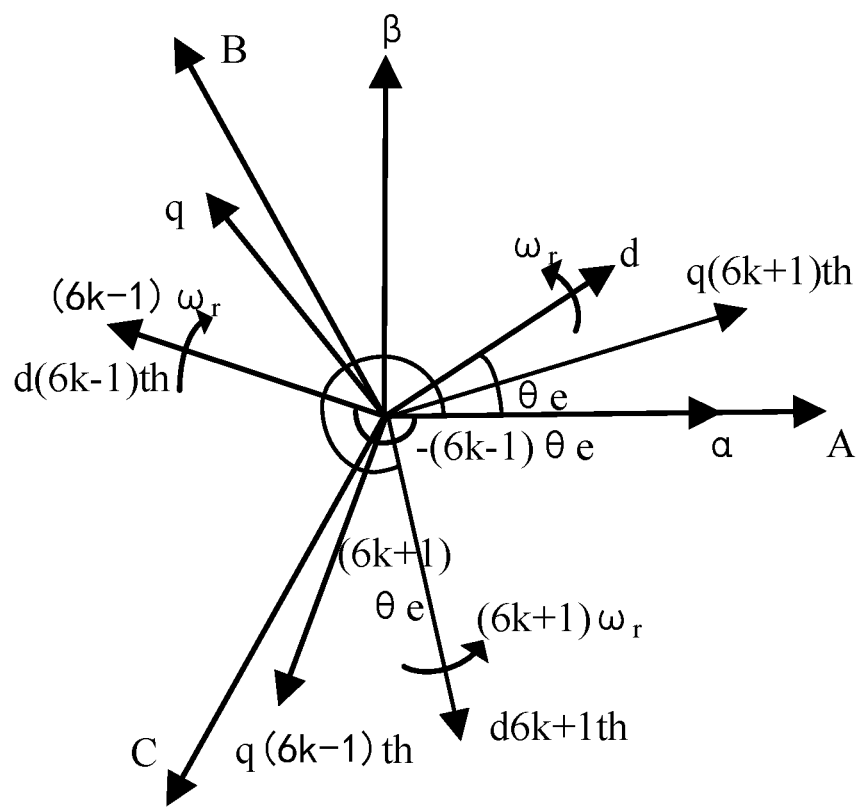
FIG. 3 is a schematic diagram of a harmonic reference frame used by the present invention.

The linear transformation module 2 is configured to perform linear transformation on a voltage, a current, etc. in a frame of the 6k±1 harmonic currents. $i_{dq(6k\pm1)}^{6k\pm1}$ is a harmonic current in a multiple synchronous reference frame, the superscript indicates the harmonic reference frame, the subscript 6k±1 indicates harmonic current order in the stationary frame, of a harmonic wave, and d,q are the axis d and the axis q in the harmonic reference frame. The harmonic reference frame is shown in FIG. 3, and a coordinate transformation matrix between the frame of the harmonic current 6k±1 and the fundamental d,q rotating frame is $$T_{dq-dq(6k-1)} = \begin{bmatrix} \cos(-6k\theta_e) & \sin(-6k\theta_e) \\ -\sin(-6k\theta_e) & \cos(-6k\theta_e) \end{bmatrix}, \quad (2)$$

$$T_{dq-dq(6k+1)} \begin{bmatrix} \cos(6k\theta_e) & \sin(6k\theta_e) \\ -\sin(6k\theta_e) & \cos(6k\theta_e) \end{bmatrix},$$

wherein $\theta_e$ is an electric angle of a rotor position.

Figure 2:
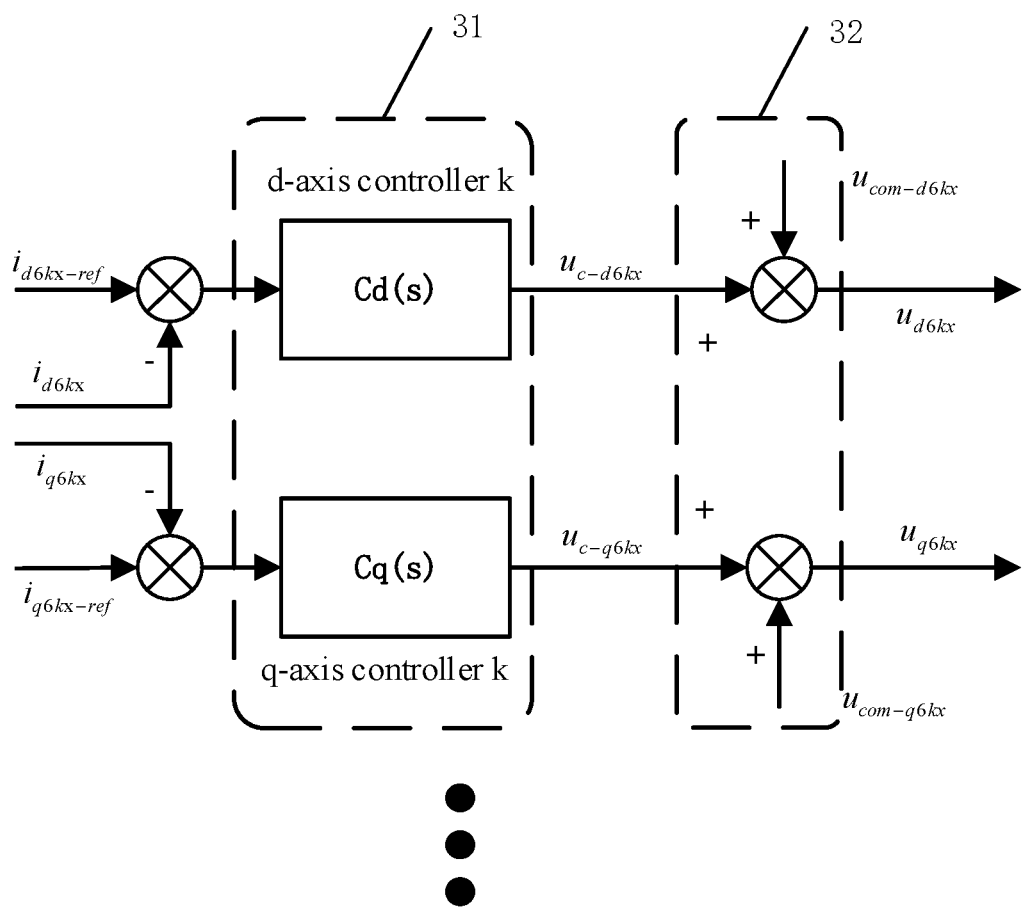
FIG. 2 is a control block diagram of a decoupling control module for the harmonic current of the present invention.

As shown in FIG. 2, the harmonic current decoupling control module 3 includes a plurality of decoupling branches for separately performing independent decoupling control over each of the harmonic currents subjected to the linear transformation, wherein the decoupling branch includes a harmonic controller 31 and a decoupling voltage compensation unit 32 which are sequentially connected, the harmonic controller 31 being configured to adjust a first output voltage according to the error between the harmonic current reference and harmonic current feedback, and the decoupling voltage compensation unit 32 being configured to compensate for the first voltage output by the harmonic controller 31 to acquire the output voltage. In FIG. 2, each decoupling branch separately performs decoupling control over harmonic currents of the axis d and the axis q.

The harmonic controller 31 is designed with an open-loop transfer function of the harmonic current to meet the following equation:

$$\begin{bmatrix} i_{d6k1} \\ i_{q6k1} \\ i_{q6k2} \\ i_{d6k2} \end{bmatrix} = \begin{bmatrix} \frac{1}{R_s + L_d s} & & & \\ & \frac{1}{R_s + L_q s} & & \\ & & \frac{1}{R_s + L_q s} & \\ & & & \frac{1}{R_s + L_d s} \end{bmatrix} \begin{bmatrix} u_{c-d6k1} \\ u_{c-q6k1} \\ u_{c-q6k2} \\ u_{c-d6k2} \end{bmatrix}, \quad (3)$$

wherein $i_{d6k1}$, $i_{q6k1}$, $i_{q6k2}$ and $i_{d6k2}$ are harmonic current feedback subjected to the linear transformation, $u_{c-d6k1}$, $u_{c-q6k1}$, $u_{c-q6k2}$ and $u_{c-d6k2}$ are first voltages, $R_s$ is a stator resistance, $L_q$ is a q-axis inductance, $L_d$ is a d-axis inductance and s is a Laplace operator;

a compensation voltage of the decoupling voltage compensation unit 32 is $$\begin{bmatrix} u_{com-d6k1} \\ u_{com-q6k1} \\ u_{com-q6k2} \\ u_{com-d6k2} \end{bmatrix} = \begin{bmatrix} 0 & -\omega_r L_q & 0 & 6k\omega_r L_d \\ \omega_r L_d & 0 & -6k\omega_r L_q & 0 \\ 0 & 6k\omega_r L_q & 0 & -\omega_r L_d \\ -6k\omega_r L_d & 0 & \omega_r L_q & 0 \end{bmatrix} \begin{bmatrix} i_{d6k1} \\ i_{q6k1} \\ i_{q6k2} \\ i_{d6k2} \end{bmatrix}, \quad (4)$$

so as to acquire the compensated output voltage:

$$\begin{bmatrix} u_{d6k1} \\ u_{q6k1} \\ u_{q6k2} \\ u_{d6k2} \end{bmatrix} = \begin{bmatrix} u_{c-d6k1} \\ u_{c-q6k1} \\ u_{c-q6k2} \\ u_{c-d6k2} \end{bmatrix} + \begin{bmatrix} u_{com-d6k1} \\ u_{com-q6k1} \\ u_{com-q6k2} \\ u_{com-d6k2} \end{bmatrix}, \quad (5)$$

wherein $u_{com-d6k1}$, $u_{com-q6k1}$, $u_{com-q6k2}$ and $u_{com-d6k2}$ are compensation voltages, $\omega_r$ is an electric angular velocity of the motor, and $u_{d6k1}$, $u_{q6k1}$, $u_{q6k2}$ and $u_{d6k2}$ are output voltages.

A particular manner in which the inversely linear transformation module 4 performs the inversely linear transformation is $$\begin{bmatrix} u^{6k-1}_{d(6k-1)} \\ u^{6k-1}_{q(6k-1)} \\ u^{6k+1}_{d(6k+1)} \\ u^{6k+1}_{q(6k+1)} \end{bmatrix} = T^{-1} \square \begin{bmatrix} u_{d6k1} \\ u_{q6k1} \\ u_{q6k2} \\ u_{d6k2} \end{bmatrix} = \frac{1}{2} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \square \begin{bmatrix} u_{d6k1} \\ u_{q6k1} \\ u_{q6k2} \\ u_{d6k2} \end{bmatrix}, \quad (6)$$

wherein $u_{d(6k-1)}^{6k-1}$ and $u_{q(6k-1)}^{6k-1}$ are 6k−1 control output voltages in the harmonic reference frame, $u_{d(6k+1)}^{6k+1}$ and $u_{q(6k+1)}^{6k-1}$ are 6k+1 control output voltages in the harmonic reference frame, $u_{d6k1}$, $u_{q6k1}$, $u_{q6k2}$ and $u_{d6k2}$ are output voltages, subscripts d and q being the axis d and the axis q in the harmonic reference frame respectively, and subscript T is a transformational matrix.

A current differential equation, in its respective harmonic reference frame, of the harmonic current is shown in the following equation.

$$\begin{bmatrix} \frac{d}{dt}i_{d(6k-1)}^{6k-1} \\ \frac{d}{dt}i_{q(6k-1)}^{6k-1} \\ \frac{d}{dt}i_{d(6k+1)}^{6k+1} \\ \frac{d}{dt}i_{q(6k+1)}^{6k+1} \end{bmatrix} = \frac{1}{2L_dL_q}\begin{bmatrix} (L_d+L_q) & 0 & -(L_d-L_q) & 0 \\ 0 & (L_d+L_q) & 0 & (L_d-L_q) \\ -(L_d-L_q) & 0 & (L_d+L_q) & 0 \\ 0 & (L_d-L_q) & 0 & (L_d+L_q) \end{bmatrix}\begin{bmatrix} u_{d(6k-1)}^{6k-1} \\ u_{q(6k-1)}^{6k-1} \\ u_{d(6k+1)}^{6k+1} \\ u_{q(6k+1)}^{6k+1} \end{bmatrix} - \quad (7)$$

$$\frac{1}{2L_dL_q}\begin{bmatrix} (L_d+L_q)R_s & -\omega_r(L_d^2-12kL_dL_q+L_q^2) & -(L_d-L_q)R_s & \omega_r(L_d^2-L_q^2) \\ \omega_r(L_d^2-12kL_dL_q+L_q^2) & (L_d+L_q)R_s & \omega_r(L_d^2-L_q^2) & (L_d-L_q)R_s \\ -(L_d-L_q)R_s & \omega_r(L_d^2-L_q^2) & (L_d+L_q)R_s & -\omega_r(L_d^2+12kL_dL_q+L_q^2) \\ \omega_r(L_d^2-L_q^2) & (L_d-L_q)R_s & \omega_r(L_d^2+12kL_dL_q+L_q^2) & (L_d+L_q)R_s \end{bmatrix}\begin{bmatrix} i_{d(6k-1)}^{6k-1} \\ i_{q(6k-1)}^{6k-1} \\ i_{d(6k+1)}^{6k+1} \\ i_{q(6k+1)}^{6k+1} \end{bmatrix},$$

For the salient pole synchronous motor, $L_d \neq L_q$. It can be seen that in the harmonic reference frame, a complex coupling relationship exists among the harmonic currents. Therefore, it is difficult for the case of traditional harmonic current performed in this frame to achieve decoupling of and high-performance control over the harmonic current. According to equations (1) and (7), a new dynamic equation of the harmonic current in linear space is $$\begin{bmatrix} \frac{d}{dt}i_{d6k1} \\ \frac{d}{dt}i_{q6k1} \\ \frac{d}{dt}i_{q6k2} \\ \frac{d}{dt}i_{d6k2} \end{bmatrix} = \begin{bmatrix} \frac{1}{L_d} & 0 & 0 & 0 \\ 0 & \frac{1}{L_q} & 0 & 0 \\ 0 & 0 & \frac{1}{L_q} & 0 \\ 0 & 0 & 0 & \frac{1}{L_d} \end{bmatrix}\begin{bmatrix} u_{d6k1} \\ u_{q6k1} \\ u_{q6k2} \\ u_{d6k2} \end{bmatrix} - \quad (8)$$

$$\begin{bmatrix} \frac{R_s}{L_d} & -\omega_r\frac{L_q}{L_d} & 0 & 6k\omega_r \\ \omega_r\frac{L_d}{L_q} & \frac{R_s}{L_q} & -6k\omega_r & 0 \\ 0 & 6k\omega_r & \frac{R_s}{L_q} & -\omega_r\frac{L_d}{L_q} \\ -6k\omega_r & 0 & \omega_r\frac{L_q}{L_d} & \frac{R_s}{L_d} \end{bmatrix}\begin{bmatrix} i_{d6k1} \\ i_{q6k1} \\ i_{q6k2} \\ i_{d6k2} \end{bmatrix},$$

By comparing an equation (5) and the current differential equation (8), the open-loop transfer function of the above harmonic current may be acquired, as particularly shown in an equation (3). Thus, it can be seen that after decoupling voltage compensation is performed, output from a harmonic current controller merely influences this harmonic current component, does not relate to the other harmonic currents. Therefore the decoupling control over the harmonic current is achieved; and meanwhile, after the harmonic current is decoupled, a transfer function of the harmonic current corresponds to an RL series loop, so as to relatively conveniently design the current controller. The harmonic current controller may use a PI controller, etc.

Figure 4:
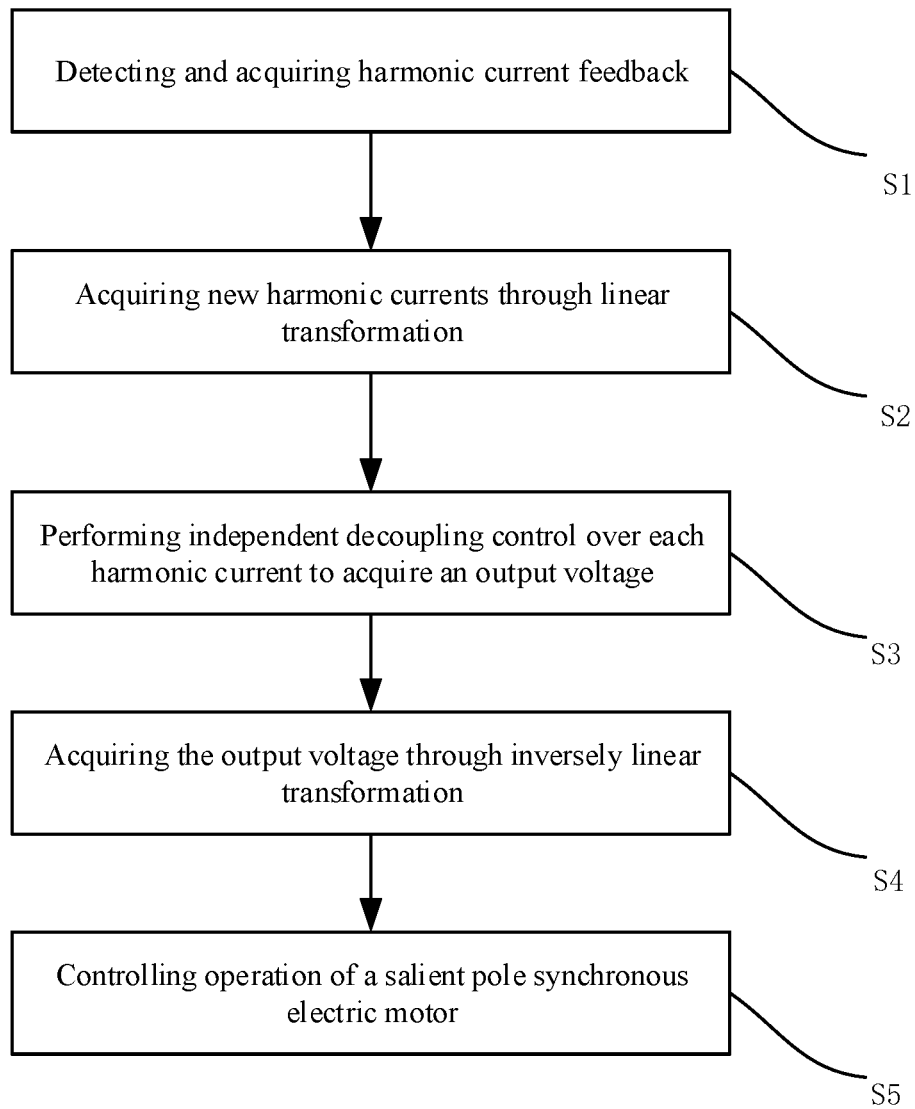
FIG. 4 is a flow block diagram of a decoupling control method for harmonic current of a salient pole synchronous motor of the present invention.

As shown in FIG. 4, a decoupling control method for a harmonic current of a salient pole synchronous motor includes the following steps:

S1. detecting 6k±1 harmonic currents in a harmonic reference frame which are treated as harmonic current feedback, wherein k is a positive integer;

S2. separately performing linear transformation on 6k±1 harmonic current references and the detected 6k±1 harmonic current feedback in a harmonic reference frame to acquire new harmonic currents;

S3. adjusting an output voltage according to an error between a harmonic current reference subjected to the linear transformation and harmonic current feedback subjected to the linear transformation, and performing independent decoupling control over each of the harmonic currents;

S4. performing inversely linear transformation on the output voltage to acquire a control output voltage in the harmonic reference frame; and S5. taking the control output voltage as a part of output voltage reference of the inverter for controlling operation of the salient pole synchronous motor.

A particular manner of acquiring the new harmonic currents through the linear transformation in step S2 is $$\begin{bmatrix} i_{d6k1-ref} \\ i_{q6k1-ref} \\ i_{q6k2-ref} \\ i_{d6k2-ref} \end{bmatrix} = T\begin{bmatrix} i_{d(6k-1)\_ref}^{6k-1} \\ i_{q(6k-1)\_ref}^{6k-1} \\ i_{d(6k+1)\_ref}^{6k+1} \\ i_{q(6k+1)\_ref}^{6k+1} \end{bmatrix}, \begin{bmatrix} i_{d6k1} \\ i_{q6k1} \\ i_{q6k2} \\ i_{d6k2} \end{bmatrix} = T\begin{bmatrix} i_{d(6k-1)}^{6k-1} \\ i_{q(6k-1)}^{6k-1} \\ i_{d(6k+1)}^{6k+1} \\ i_{q(6k+1)}^{6k+1} \end{bmatrix}, \quad (9)$$

$$T = \begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

wherein $i_{d(6k-1)\_ref}^{6k-1}$ and $i_{q(6k-1)\_ref}^{6k-1}$ are 6k−1 harmonic current references in the harmonic reference frame, $i_{d(6k+1)\_ref}^{6k+1}$ and $i_{q(6k+1)\_ref}^{6k+1}$ are 6k+1 harmonic current references in the harmonic reference frame, $i_{d6k1-ref}$, $i_{q6k1-ref}$, $i_{d6k2-ref}$ and $i_{q6k2-ref}$ are harmonic current references subjected to the linear transformation, $i_{d(6k-1)}^{6k-1}$ and $i_{q(6k-1)}^{6k-1}$ are 6k−1 harmonic current feedback in the harmonic reference frame, $i_{d(6k+1)}^{6k+1}$ and $i_{q(6k+1)}^{6k+1}$ are 6k+1 harmonic current feedback in the harmonic reference frame, $i_{d6k1}$, $i_{q6k1}$, $i_{q6k2}$ and $i_{d6k2}$ are harmonic current feedback subjected to the linear transformation, subscripts d and q being the axis d and the axis q in the harmonic reference frame respectively, and subscript T is a transformational matrix.

Step 3 particularly includes: separately inputting each of the harmonic currents subjected to the linear transformation into an independent decoupling branch, wherein the decoupling branch includes a harmonic controller 31 and a decoupling voltage compensation unit 32 which are sequentially connected, firstly, the harmonic controller 31 adjusting the error between the harmonic current reference and the harmonic current feedback and output a first voltage, and then the decoupling voltage compensation unit 32 compensating for the first voltage output by the harmonic controller 31 to acquire the output voltage.

The harmonic controller 31 in step S3 is designed with an open-loop transfer function of the harmonic current to meet the following equation:

$$\begin{bmatrix} i_{d6k1} \\ i_{q6k1} \\ i_{q6k2} \\ i_{d6k2} \end{bmatrix} = \begin{bmatrix} \frac{1}{R_s + L_d s} & & & \\ & \frac{1}{R_s + L_q s} & & \\ & & \frac{1}{R_s + L_q s} & \\ & & & \frac{1}{R_s + L_d s} \end{bmatrix} \begin{bmatrix} u_{c-d6k1} \\ u_{c-q6k1} \\ u_{c-q6k2} \\ u_{c-d6k2} \end{bmatrix}, \quad (10)$$

wherein $i_{d6k1}$, $i_{q6k1}$, $i_{q6k2}$ and $i_{d6k2}$ are harmonic current feedback subjected to the linear transformation, $u_{c-d6k1}$, $u_{c-q6k1}$, $u_{c-q6k1}$ and $u_{c-d6k2}$ are first voltages, $R_s$ is a stator resistance, $L_q$ is a q-axis inductance, $L_d$ is a d-axis inductance and s is a Laplace operator;

A compensation voltage of the decoupling voltage compensation unit 32 is $$\begin{bmatrix} u_{com-d6k1} \\ u_{com-q6k1} \\ u_{com-q6k2} \\ u_{com-d6k2} \end{bmatrix} = \begin{bmatrix} 0 & -\omega_r L_q & 0 & 6k\omega_r L_d \\ \omega_r L_d & 0 & -6k\omega_r L_q & 0 \\ 0 & 6k\omega_r L_d & 0 & -\omega_r L_d \\ -6k\omega_r L_d & 0 & \omega_r L_q & 0 \end{bmatrix} \begin{bmatrix} i_{d6k1} \\ i_{q6k1} \\ i_{q6k2} \\ i_{d6k2} \end{bmatrix}, \quad (11)$$

so as to acquire the compensated output voltage:

$$\begin{bmatrix} u_{d6k1} \\ u_{q6k1} \\ u_{q6k2} \\ u_{d6k2} \end{bmatrix} = \begin{bmatrix} u_{c-d6k1} \\ u_{c-q6k1} \\ u_{c-q6k2} \\ u_{c-d6k2} \end{bmatrix} + \begin{bmatrix} u_{com-d6k1} \\ u_{com-q6k1} \\ u_{com-q6k2} \\ u_{com-d6k2} \end{bmatrix}, \quad (12)$$

wherein $u_{com-d6k1}$, $u_{com-q6k1}$, $u_{com-d6k2}$ and $u_{com-d6k2}$ are compensation voltages, $\omega_r$ is an electric angular velocity of the motor, and $u_{d6k1}$, $u_{q6k1}$, $u_{q6k2}$ and $u_{d6k2}$ are output voltages.

A particular manner of acquiring the control output voltage in the harmonic reference frame through the inversely linear transformation in step S4 is $$\begin{bmatrix} u_{d(6k-1)}^{6k-1} \\ u_{q(6k-1)}^{6k-1} \\ u_{d(6k+1)}^{6k+1} \\ u_{q(6k+1)}^{6k+1} \end{bmatrix} = T^{-1} \begin{bmatrix} u_{d6k1} \\ u_{q6k1} \\ u_{q6k2} \\ u_{d6k2} \end{bmatrix} = \frac{1}{2} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \begin{bmatrix} u_{d6k1} \\ u_{q6k1} \\ u_{q6k2} \\ u_{d6k2} \end{bmatrix}, \quad (13)$$

wherein $u_{d(6k-1)}^{6k-1}$ and $u_{q(6k-1)}^{6k-1}$ are 6k−1 control output voltages in the harmonic reference frame, $u_{d(6k+1)}^{6k+1}$ and $u_{q(6k+1)}^{6k+1}$ are 6k+1 control output voltages in the harmonic reference frame, $u_{d6k1}$, $u_{q6k1}$, $u_{q6k2}$ and $u_{d6k2}$ are output voltages, subscripts d and q being the axis d and the axis q in the harmonic reference frame respectively, and subscript T is a transformational matrix.

The present invention is designed with the harmonic controller 31 and the decoupling voltage compensation unit 32, thereby achieving dynamic decoupling control over the harmonic current, and improving control accuracy and response speed of the harmonic current; and meanwhile, the present invention utilizes linear transformation rather than directly performs decoupling control over the harmonic current in the harmonic reference frame, thereby more conveniently decoupling the harmonic current.

The above embodiments are merely examples, rather than limitation to the scope of the present invention. These embodiments may further be implemented in other various manners, and may be omitted, replaced and changed in various manners without departing from the scope of technical ideas of the present invention.

What is claimed is:

1. A decoupling control system for a harmonic current of a salient pole synchronous motor, comprising:
   a harmonic current detection module (1), configured to detect and acquire 6k±1 harmonic currents and take the same as harmonic current feedback, wherein k is a positive integer;
   a linear transformation module (2), configured to perform linear transformation on 6k±1 harmonic current references and the detected 6k±1 harmonic current feedback to acquire new harmonic currents in a harmonic reference frame separately;
   a harmonic current decoupling control module (3), configured to adjust an output voltage according to an error between a harmonic current reference subjected to the linear transformation and harmonic current feedback subjected to the linear transformation, and perform independent decoupling control over each of the harmonic currents;
   an inversely linear transformation module (4), configured to perform inversely linear transformation on the output voltage of the harmonic current decoupling control module (3) to acquire a control output voltage in the harmonic reference frame; and
   a motor control module (6), configured to take the control output voltage as a part of output voltage reference of the inverter for controlling operation of the salient pole synchronous motor.

2. The decoupling control system for the harmonic current of the salient pole synchronous motor of claim 1, wherein a particular manner in which the linear transformation module (2) performs the linear transformation is $$\begin{bmatrix} i_{d6k1-ref} \\ i_{q6k1-ref} \\ i_{q6k2-ref} \\ i_{d6k2-ref} \end{bmatrix} = T \begin{bmatrix} i_{d(6k-1)\_ref}^{6k-1} \\ i_{q(6k-1)\_ref}^{6k-1} \\ i_{d(6k+1)\_ref}^{6k+1} \\ i_{q(6k+1)\_ref}^{6k+1} \end{bmatrix} \begin{bmatrix} i_{d6k1} \\ i_{q6k1} \\ i_{q6k2} \\ i_{d6k2} \end{bmatrix} = T \begin{bmatrix} i_{d(6k-1)}^{6k-1} \\ i_{q(6k-1)}^{6k-1} \\ i_{d(6k+1)}^{6k+1} \\ i_{q(6k+1)}^{6k+1} \end{bmatrix},$$

$$T = \begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

wherein $i_{d(6k-1)\_ref}^{6k-1}$ and $i_{q(6k-1)\_ref}^{6k-1}$ are 6k−1 harmonic current references in the harmonic reference frame, $i_{d(6k+1)\_ref}^{6k+1}$ and $i_{q(6k+1)\_ref}^{6k+1}$ are 6k+1 harmonic current references in the harmonic reference frame, $i_{d6k1-ref}$, $i_{q6k1-ref}$, $i_{q6k2-ref}$ and $i_{d6k2-ref}$ are harmonic current references subjected to the linear transformation, $i_{d(6k-1)}^{6k-1}$ and $i_{q(6k-1)}^{6k-1}$ are 6k−1 harmonic current feedback in the harmonic reference frame, $i_{d(6k+1)}^{6k+1}$ and $i_{q(6k+1)}^{6k+1}$ are 6k+1 harmonic current feedback in the harmonic reference frame, $i_{d6k1}$, $i_{q6k1}$, $i_{q6k2}$ and $i_{d6k2}$ are harmonic current feedback subjected to the linear transformation, subscripts d and q being an axis d and an axis q in the harmonic reference frame respectively, and subscript T is a transformational matrix.

3. The decoupling control system for the harmonic current of the salient pole synchronous motor of claim 2, wherein the harmonic current decoupling control module (3) comprises a plurality of decoupling branches for separately performing independent decoupling control over each of the harmonic currents subjected to the linear transformation, wherein the decoupling branch comprises a harmonic controller (31) and a decoupling voltage compensation unit (32) which are sequentially connected, the harmonic controller (31) being configured to adjust a first output voltage according to the error between the harmonic current reference and harmonic current feedback, and the decoupling voltage compensation unit (32) being configured to compensate for the first voltage output by the harmonic controller (31) to acquire the output voltage.

4. The decoupling control system for the harmonic current of the salient pole synchronous motor of claim 3, wherein the harmonic controller (31) is designed with an open-loop transfer function of the harmonic current to meet the following equation:

$$\begin{bmatrix} i_{d6k1} \\ i_{q6k1} \\ i_{q6k2} \\ i_{d6k2} \end{bmatrix} = \begin{bmatrix} \frac{1}{R_s + L_d s} \\ \frac{1}{R_s + L_q s} \\ \frac{1}{R_s + L_q s} \\ \frac{1}{R_s + L_d s} \end{bmatrix} \begin{bmatrix} u_{c-d6k1} \\ u_{c-q6k1} \\ u_{c-q6k2} \\ u_{c-d6k2} \end{bmatrix},$$

wherein $i_{d6k1}$, $i_{q6k1}$, $i_{q6k2}$ and $i_{d6k2}$ are harmonic current feedback subjected to the linear transformation, $u_{c-d6k1}$, $u_{c-q6k1}$, $u_{c-q6k2}$ and $u_{c-d6k2}$ are first voltages, $R_s$ is a stator resistance, $L_q$ is a q-axis inductance, $L_d$ is a d-axis inductance and s is a Laplace operator;

a compensation voltage of the decoupling voltage compensation unit (32) is $$\begin{bmatrix} u_{com-d6k1} \\ u_{com-q6k1} \\ u_{com-q6k2} \\ u_{com-d6k2} \end{bmatrix} = \begin{bmatrix} 0 & -\omega_r L_q & 0 & 6k\omega_r L_d \\ \omega_r L_d & 0 & -6k\omega_r L_q & 0 \\ 0 & 6k\omega_r L_d & 0 & -\omega_r L_q \\ -6k\omega_r L_d & 0 & \omega_r L_q & 0 \end{bmatrix} \begin{bmatrix} i_{d6k1} \\ i_{q6k1} \\ i_{q6k2} \\ i_{d6k2} \end{bmatrix},$$

so as to acquire the compensated output voltage:

$$\begin{bmatrix} u_{d6k1} \\ u_{q6k1} \\ u_{q6k2} \\ u_{d6k2} \end{bmatrix} = \begin{bmatrix} u_{c-d6k1} \\ u_{c-q6k1} \\ u_{c-q6k2} \\ u_{c-d6k2} \end{bmatrix} + \begin{bmatrix} u_{com-d6k1} \\ u_{com-q6k1} \\ u_{com-q6k2} \\ u_{com-d6k2} \end{bmatrix},$$

wherein $u_{com-d6k1}$, $u_{com-q6k1}$, $u_{com-q6k2}$ and $u_{com-d6k2}$ are compensation voltages, $\omega_r$ is an electric angular velocity of the motor, and $u_{d6k1}$, $u_{q6k1}$, $u_{q6k2}$ and $u_{d6k2}$ are output voltages.

5. The decoupling control system for the harmonic current of the salient pole synchronous motor of claim 1, wherein a particular manner in which the inversely linear transformation module (4) performs the inversely linear transformation is $$\begin{bmatrix} u_{d(6k-1)}^{6k-1} \\ u_{q(6k-1)}^{6k-1} \\ u_{d(6k+1)}^{6k+1} \\ u_{q(6k+1)}^{6k+1} \end{bmatrix} = T^{-1} \begin{bmatrix} u_{d6k1} \\ u_{q6k1} \\ u_{q6k2} \\ u_{d6k2} \end{bmatrix} = \frac{1}{2} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \begin{bmatrix} u_{d6k1} \\ u_{q6k1} \\ u_{q6k2} \\ u_{d6k2} \end{bmatrix},$$

wherein $u_{d(6k-1)}^{6k-1}$ and $u_{q(6k-1)}^{6k-1}$ are 6k−1 control output voltages in the harmonic reference frame, $u_{d(6k+1)}^{6k+1}$ and $u_{q(6k+1)}^{6k+1}$ are 6k+1 control output voltages in the harmonic reference frame, $u_{d6k1}$, $u_{q6k1}$, $u_{q6k2}$ and $u_{d6k2}$ are output voltages, subscripts d and q being an axis d and an axis q in the harmonic reference frame respectively, and subscript T is a transformational matrix.

6. A decoupling control method for a harmonic current for a control unit of a salient pole synchronous motor, comprising the following steps:
S1. detecting 6k±1 harmonic currents using a harmonic current detector in a harmonic reference frame which are treated as harmonic current feedback, wherein k is a positive integer;
S2. separately performing, in the control unit, linear transformation on 6k±1 harmonic current references and the detected 6k±1 harmonic current feedback in a harmonic reference frame to acquire new harmonic currents;
S3. adjusting, in the control unit, an output voltage according to an error between a harmonic current reference subjected to the linear transformation and harmonic current feedback subjected to the linear transformation, and performing independent decoupling control over each of the harmonic currents;
S4. performing, in the control unit, inversely linear transformation on the output voltage to acquire a control output voltage in the harmonic reference frame; and
S5. taking the control output voltage as a part of output voltage reference of an inverter for controlling operation of the salient pole synchronous motor by the control unit.

7. The decoupling control method for the harmonic current of the salient pole synchronous motor of claim 6, wherein a particular manner of acquiring the new harmonic currents through the linear transformation in step S2 is $$\begin{bmatrix} i_{d6k1-ref} \\ i_{q6k1-ref} \\ i_{q6k2-ref} \\ i_{d6k2-ref} \end{bmatrix} = T \begin{bmatrix} i_{d(6k-1)\_ref}^{6k-1} \\ i_{q(6k-1)\_ref}^{6k-1} \\ i_{d(6k+1)\_ref}^{6k+1} \\ i_{q(6k+1)\_ref}^{6k+1} \end{bmatrix}, \begin{bmatrix} i_{d6k1} \\ i_{q6k1} \\ i_{q6k2} \\ i_{d6k2} \end{bmatrix} = T \begin{bmatrix} i_{d(6k-1)}^{6k-1} \\ i_{q(6k-1)}^{6k-1} \\ i_{d(6k+1)}^{6k+1} \\ i_{q(6k+1)}^{6k+1} \end{bmatrix},$$

$$T = \begin{bmatrix} 1 & 0 & 1 & 0 \\ 0 & 1 & 0 & 1 \\ 1 & 0 & -1 & 0 \\ 0 & 1 & 0 & -1 \end{bmatrix},$$

wherein $i_{d(6k-1)\_ref}^{6k-1}$ and $i_{q(6k-1)\_ref}^{6k-1}$ are harmonic current references 6k−1 in the harmonic reference frame, $i_{d(6k+1)\_ref}^{6k+1}$ and $i_{q(6k+1)\_ref}^{6k+1}$ are 6k+1 harmonic current references in the harmonic reference frame, $i_{d6k1\_ref}$, $i_{q6k1\_ref}$, $i_{q6k2\_ref}$ and $i_{d6k2\_ref}$ are harmonic current references subjected to the linear transformation, $i_{d(6k-1)}^{6k-1}$ and $i_{q(6k-1)}^{6k-1}$ are 6k−1 harmonic current feedback in the harmonic reference frame, and $i_{d(6k+1)}^{6k+1}$ and $i_{q(6k+1)}^{6k+1}$ are 6k+1 harmonic current feedback in the harmonic reference frame, $i_{d6k1}$, $i_{q6k1}$, $i_{q6k2}$ and $i_{d6k2}$ are harmonic current feedback subjected to the linear transformation, subscripts d and q being an axis d and an axis q in the harmonic reference frame respectively, and subscript T is a transformational matrix.

8. The decoupling control method for the harmonic current of the salient pole synchronous motor of claim 7, wherein step 3 particularly comprises: separately inputting each of the harmonic currents subjected to the linear transformation into an independent decoupling branch, wherein the decoupling branch comprises a harmonic controller (31) and a decoupling voltage compensation unit (32) which are sequentially connected, firstly, the harmonic controller (31) adjusting a first output voltage according to the error between the harmonic current reference and the harmonic current feedback, and then the decoupling voltage compensation unit (32) compensating for the first voltage output by the harmonic controller (31) to acquire the output voltage.

9. The decoupling control method for the harmonic current of the salient pole synchronous motor of claim 8, wherein the harmonic controller (31) in step S3 is designed with an open-loop transfer function of the harmonic current to meet the following equation:

$$\begin{bmatrix} i_{d6k1} \\ i_{q6k1} \\ i_{q6k2} \\ i_{d6k2} \end{bmatrix} = \begin{bmatrix} \frac{1}{R_s + L_d s} \\ \frac{1}{R_s + L_q s} \\ \frac{1}{R_s + L_q s} \\ \frac{1}{R_s + L_d s} \end{bmatrix} \begin{bmatrix} u_{c-d6k1} \\ u_{c-q6k1} \\ u_{c-q6k2} \\ u_{c-d6k2} \end{bmatrix},$$

wherein $i_{d6k1}$, $i_{q6k1}$, $i_{q6k2}$ and $i_{d6k2}$ are harmonic current feedback subjected to the linear transformation, $u_{c-d6k1}$, $u_{c-q6k1}$, $u_{c-q6k2}$ and $u_{c-d6k2}$ are first voltages, $R_s$ is a stator resistance, $L_q$ is a q-axis inductance, $L_d$ is a d-axis inductance and s is a Laplace operator;

a compensation voltage of the decoupling voltage compensation unit (32) is $$\begin{bmatrix} u_{com-d6k1} \\ u_{com-q6k1} \\ u_{com-q6k2} \\ u_{com-d6k2} \end{bmatrix} = \begin{bmatrix} 0 & -\omega_r L_q & 0 & 6k\omega_r L_d \\ \omega_r L_d & 0 & -6k\omega_r L_q & 0 \\ 0 & 6k\omega_r L_d & 0 & -\omega_r L_d \\ -6k\omega_r L_d & 0 & \omega_r L_q & 0 \end{bmatrix} \begin{bmatrix} i_{d6k1} \\ i_{q6k1} \\ i_{q6k2} \\ i_{d6k2} \end{bmatrix},$$

so as to acquire the compensated output voltage:

$$\begin{bmatrix} u_{d6k1} \\ u_{q6k1} \\ u_{q6k2} \\ u_{d6k2} \end{bmatrix} = \begin{bmatrix} u_{c-d6k1} \\ u_{c-q6k1} \\ u_{c-q6k2} \\ u_{c-d6k2} \end{bmatrix} + \begin{bmatrix} u_{com-d6k1} \\ u_{com-q6k1} \\ u_{com-q6k2} \\ u_{com-d6k2} \end{bmatrix},$$

wherein $u_{com-d6k1}$, $u_{com-q6k1}$, $u_{com-q6k2}$ and $u_{com-d6k2}$ are compensation voltages, $\omega_r$ is an electric angular velocity of the motor, and $u_{d6k1}$, $u_{q6k1}$, $u_{q6k2}$ and $u_{d6k2}$ are output voltages.

10. The decoupling control method for the harmonic current of the salient pole synchronous motor of claim 6, wherein a particular manner of acquiring the control output voltage in the harmonic reference frame through the inversely linear transformation in step S4 is $$\begin{bmatrix} u_{d(6k-1)}^{6k-1} \\ u_{q(6k-1)}^{6k-1} \\ u_{d(6k+1)}^{6k+1} \\ u_{q(6k+1)}^{6k+1} \end{bmatrix} = T^{-1} \begin{bmatrix} u_{d6k1} \\ u_{q6k1} \\ u_{q6k2} \\ u_{d6k2} \end{bmatrix} = \frac{1}{2} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \begin{bmatrix} u_{d6k1} \\ u_{q6k1} \\ u_{q6k2} \\ u_{d6k2} \end{bmatrix},$$

wherein $u_{d(6k-1)}^{6k-1}$ and $u_{q(6k-1)}^{6k-1}$ are 6k−1 control output voltages in the harmonic reference frame, $u_{d(6k+1)}^{6k+1}$ and $u_{q(6k+1)}^{6k+1}$ are 6k+1 control output voltages in the harmonic reference frame, $u_{d6k1}$, $u_{q6k1}$, $u_{q6k2}$ and $u_{d6k2}$ are output voltages, subscripts d and q being an axis d and an axis q in the harmonic reference frame respectively, and subscript T is a transformational matrix.

* * * * *